(12) United States Patent
Park et al.

(10) Patent No.: US 12,051,311 B2
(45) Date of Patent: Jul. 30, 2024

(54) FOREST FIRE DETECTION SYSTEM AND METHOD CAPABLE OF DETERMINING WHETHER EVENTS ARE SAME

(71) Applicant: AlcheraX, Inc., Sunnyvale, CA (US)

(72) Inventors: Hee Chan Park, Ansan-si (KR); Minkook Cho, Seoul (KR); Jae Hyeok Kang, Seongnam-si (KR); Youngseo Cha, Yongin-si (KR); Yewon Jun, Seoul (KR)

(73) Assignee: ALCHERAX, INC., Sunnyvale, CA (US)

( * ) Notice: Subject to any disclaimer, the term of this patent is extended or adjusted under 35 U.S.C. 154(b) by 144 days.

(21) Appl. No.: 17/943,349

(22) Filed: Sep. 13, 2022

(65) Prior Publication Data

US 2023/0147316 A1 May 11, 2023

(30) Foreign Application Priority Data

Nov. 9, 2021 (KR) .......... 10-2021-0153417
Jun. 3, 2022 (KR) .......... 10-2022-0068360

(51) Int. Cl.
*G08B 17/00* (2006.01)
*G06V 10/62* (2022.01)
*G06V 10/70* (2022.01)
*G06V 20/10* (2022.01)

(52) U.S. Cl.
CPC .......... *G08B 17/005* (2013.01); *G06V 10/62* (2022.01); *G06V 10/70* (2022.01); *G06V 20/188* (2022.01)

(58) Field of Classification Search
CPC ..................................... G08B 17/005
See application file for complete search history.

(56) References Cited

U.S. PATENT DOCUMENTS

| 2008/0309501 | A1* | 12/2008 | Redaelli | G08B 17/005 |
| | | | | 340/577 |
| 2020/0388128 | A1* | 12/2020 | Lee | G06V 10/62 |
| 2021/0283439 | A1* | 9/2021 | Raucher | B64D 47/08 |
| 2023/0147316 | A1* | 5/2023 | Park | G06V 20/188 |
| | | | | 340/577 |

FOREIGN PATENT DOCUMENTS

| KR | 10-1999-0007522 | 1/1999 |
| KR | 10-2020-0116560 | 10/2020 |

* cited by examiner

*Primary Examiner* — Travis R Hunnings
(74) *Attorney, Agent, or Firm* — LEX IP MEISTER, PLLC

(57) ABSTRACT

Provided are a forest fire detection system and method capable of determining whether events. The forest fire detection system includes an artificial intelligence-based forest fire detection module configured to detect a forest fire from a captured image using an artificial intelligence model; a monitoring camera configured to monitor a predetermined area; a direction estimation module configured to estimate a direction of the forest fire on a map, using a plurality of forest fire detection images provided from the artificial intelligence-based forest fire detection module and data of the monitoring camera; and a same event determination module configured to determine whether events represented by the plurality of forest fire detection images are the same, based on the estimated direction of the forest fire.

16 Claims, 8 Drawing Sheets

FOREST FIRE DETECTION SYSTEM AND METHOD CAPABLE OF DETERMINING WHETHER EVENTS ARE SAME

CROSS-REFERENCE TO RELATED APPLICATION

This application claims priority to and the benefit of Korean Patent Application No. 10-2021-0153417 filed in the Korean Intellectual Property Office on Nov. 9, 2021, and Korean Patent Application No. 10-2022-0068360 filed in the Korean Intellectual Property Office on Jun. 3, 2022, the entire contents of which are incorporated herein by reference.

BACKGROUND OF THE DISCLOSURE

(a) Field of the Disclosure

The disclosure relates to a forest fire detection system and method capable of determining whether events are the same.

(b) Description of the Related Art

Since forest fires occur in forests, the forest fires are difficult to be early detected and cause large-scale damage when the forest fires spread. That is, the earlier the initial detection, the easier it is to extinguish the forest fire and the more likely it is to prevent the spread in advance. To this end, various methods of fire detection are being researched, such as using an Internet of Things (IoT) sensor, using a satellite image analysis, or detecting a fire based on a camera. In addition, research on technology of providing a forest fire notification to users when a fire is detected is also active.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a forest fire detection system and method having advantages of determining whether events represented by a plurality of forest fire detection images are the same.

An embodiment of the present disclosure provides a forest fire detection system including an artificial intelligence-based forest fire detection module configured to detect a forest fire from a captured image using an artificial intelligence model; a monitoring camera configured to monitor a predetermined area; a direction estimation module configured to estimate a direction of the forest fire on a map, using a plurality of forest fire detection images provided from the artificial intelligence-based forest fire detection module and data of the monitoring camera; and a same event determination module configured to determine whether events represented by the plurality of forest fire detection images are the same, based on the estimated direction of the forest fire.

In some embodiments, the direction estimation module may output the direction of the forest fire on the map using a horizontal angle and a vertical angle.

In some embodiments, the same event determination module may compare the horizontal angle and the vertical angle with respect to the plurality of forest fire detection images and determine whether the events represented by the plurality of forest fire detection images are the same.

In some embodiments, the forest fire detection system may further include a forest fire notification module that omits a forest fire notification to a user when it is determined that the events represented by the plurality of forest fire detection images are the same.

In some embodiments, the plurality of forest fire detection images may include an image generation time, an image resolution value, and pixel information where the forest fire is located.

In some embodiments, the data of the monitoring camera may include information about a camera field of view (FoV), a camera position including a latitude and a longitude, and a camera pan-tilt-zoom (PTZ).

In some embodiments, the direction estimation module may estimate the direction of the forest fire on the map based on the pixel information and the information about the camera FoV and the camera PTZ.

In some embodiments, when the data of the monitoring camera is provided at a first time and a second time, and the forest fire detection images are provided between the first time and the second time, the direction estimation module may estimate the direction of the forest fire on the map based on the data at the first time if the data at the first time is the same as the data at the second time, and estimate the direction of the forest fire on the map based on the data at the first time if the data of the first time is different from the data of the second time, and if values of a pan and a FoV of the second time are included in values of a pan and a FoV of the first time.

Another embodiment of the present disclosure provides a forest fire detection method including detecting a forest fire from a captured image using an artificial intelligence model; monitoring a predetermined area, using a monitoring camera; estimating a direction of the forest fire on a map, using a plurality of detected forest fire detection images and data of the monitoring camera; and determining whether events represented by the plurality of forest fire detection images are the same, based on the estimated direction of the forest fire.

In some embodiments, the estimating of the direction of the forest fire on the map may include outputting the direction of the forest fire on the map using a horizontal angle and a vertical angle.

In some embodiments, the determining of whether events represented by the plurality of forest fire detection images are the same may include comparing the horizontal angle and the vertical angle with respect to the plurality of forest fire detection images and determining whether the events represented by the plurality of forest fire detection images are the same.

In some embodiments, the forest fire detection method may further include omitting a forest fire notification to a user when it is determined that the events represented by the plurality of forest fire detection images are the same.

In some embodiments, the plurality of forest fire detection images may include an image generation time, an image resolution value, and pixel information where the forest fire is located.

In some embodiments, the data of the monitoring camera may include information about a camera field of view (FoV), a camera position including a latitude and a longitude, and a camera pan-tilt-zoom (PTZ).

In some embodiments, the estimating of the direction of the forest fire on the map may include estimating the direction of the forest fire on the map based on the pixel information and the information about the camera FoV and the camera PTZ.

In some embodiments, when the data of the monitoring camera is provided at a first time and a second time, and the forest fire detection images are provided between the first time and the second time, the estimating of the direction of the forest fire on the map may include estimating the direction of the forest fire on the map based on the data at the first time if the data at the first time is the same as the data at the second time, and estimating the direction of the forest fire on the map based on the data at the first time if the data of the first time is different from the data of the second time, and if values of a pan and a FoV of the second time are included in values of a pan and a FoV of the first time.

DETAILED DESCRIPTION OF THE EMBODIMENTS

Figure 1:
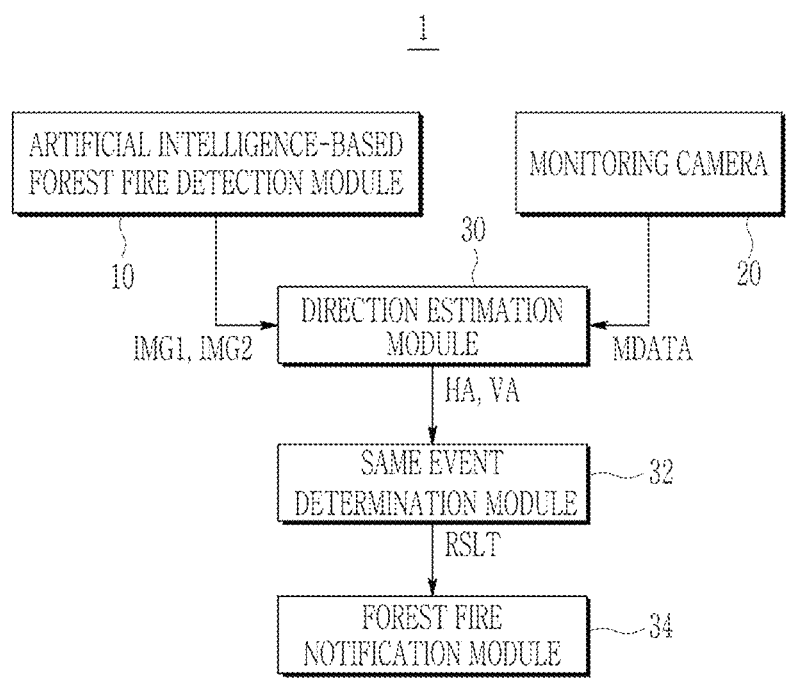
FIG. 1 is a block diagram illustrating a forest fire detection system according to an embodiment.

Hereinafter, with reference to the accompanying drawings, the present disclosure will be described in detail such that those skilled in the art may easily carry out the present disclosure with respect to the embodiments of the present disclosure. However, the present disclosure may be embodied in many different forms and is not limited to the embodiments set forth herein. In addition, to clearly describe the present disclosure, parts unrelated to the descriptions are omitted, and the same or similar elements are denoted with the same reference numerals throughout the specification.

Throughout the specification, unless explicitly described to the contrary, the word "comprise", and variations such as "comprises" or "comprising", will be understood to imply the inclusion of stated elements but not the exclusion of any other elements.

In addition, the terms "-er", "-or", and "module" described in the specification mean units for processing at least one function and operation, and may be implemented by hardware components or software components, and combinations thereof. In addition, a prediction method capable of correcting a renewable energy error using a battery according to the embodiments described below may be implemented as a program or software, and the program or software may be stored in a computer-readable medium.

FIG. 1 is a block diagram illustrating a forest fire detection system according to an embodiment.

Referring to FIG. 1, a forest fire detection system 1 according to an embodiment may include an artificial intelligence-based forest fire detection module 10, a monitoring camera 20, a direction estimation module 30, a same event determination module 32, and a forest fire notification module 34.

The artificial intelligence-based forest fire detection module 10 may detect a forest fire from a captured image using an artificial intelligence model. Specifically, the artificial intelligence-based forest fire detection module 10 may receive captured images from a plurality of cameras installed for fire monitoring, analyze the captured images through then artificial intelligence model, and determine whether a fire actually has occurred from anomalies such as a smoke generation in the captured images. In some embodiments, the artificial intelligence-based forest fire detection module 10 may detect the forest fire using a deep learning technique.

The monitoring camera 20 may monitor a predetermined area where the forest fire is likely to occur. The monitoring camera 20 may capture the predetermined area where the forest fire is likely to occur at a predetermined time interval and provide a captured image such as a color image, a near-infrared image, etc.

The direction estimation module 30 may estimate a direction of the forest fire on a map, using a plurality of forest fire detection images IMG1 and IMG2 provided from the artificial intelligence-based forest fire detection module 10 and data MDATA of the monitoring camera 20. Specifically, the direction estimation module 30 may output the direction of the forest fire on the map, using a horizontal angle HA and a vertical angle VA. Here, the horizontal angle HA and the vertical angle VA may indicate in which direction the forest fire on the plurality of forest fire detection images IMG1 and IMG2 has actually occurred from the monitoring camera 20 on an actual map.

The plurality of forest fire detection images IMG1 and IMG2 may include an image generation time, an image resolution value, and pixel information where the forest fire is located. Here, the pixel information where the forest fire is located may include pixel information about a bounding box displayed to surround smoke or flame that is predicted to be the forest fire. The bounding box may be generated by the above-described artificial intelligence model.

The data MDATA of the monitoring camera 20 may include information about a camera field of view (FoV), a camera position including latitude and longitude, and a camera pan-tilt-zoom (PTZ).

The direction estimation module 30 may estimate the direction of the forest fire on the map, using the pixel information where the forest fire is located, and the information about the camera FoV and the camera PTZ.

The same event determination module 32 may determine whether events represented by the plurality of forest fire detection images IMG1 and IMG2 are the same, based on the direction of the forest fire estimated by the direction estimation module 30. Specifically, the same event determination module 32 may compare the horizontal angle HA and the vertical angle VA of the plurality of forest fire detection images IMG1 and IMG2 with each other and determine whether the events represented by the plurality of forest fire detection images IMG1 and IMG2 are the same.

When it is determined that the events represented by the plurality of forest fire detection images IMG1 and IMG2 are the same, the forest fire notification module 34 may omit a forest fire notification to a user based on a determination result RSLT. That is, the forest fire notification module 34 may provide the forest fire notification to the user only when it is determined that the events represented by the plurality of forest fire detection images IMG1 and IMG2 are different, and may omit the forest fire notification to the user when it is determined that the events represented by the plurality of forest fire detection images IMG1 and IMG2 are the same. Accordingly, unnecessary redundant notifications may be reduced and the accuracy of forest fire notification may be increased, by determining whether events represented by a plurality of forest fire detection images are the same.

Figure 2:
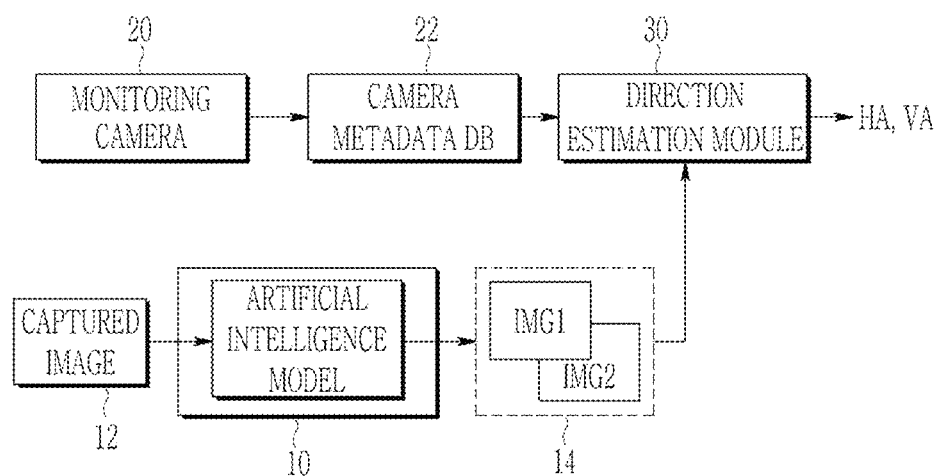
FIG. 2 is a block diagram illustrating a forest fire detection system according to an embodiment.

FIG. 2 is a block diagram illustrating a forest fire detection system according to an embodiment.

Referring to FIG. 2, in the forest fire detection system according to an embodiment, the data MDATA of a monitoring camera may be stored in a camera metadata database (DB) 22. In addition, the direction estimation module 30 may read the data MDATA of the monitoring camera stored in the camera metadata DB 22 at a predetermined time period.

Figure 3:
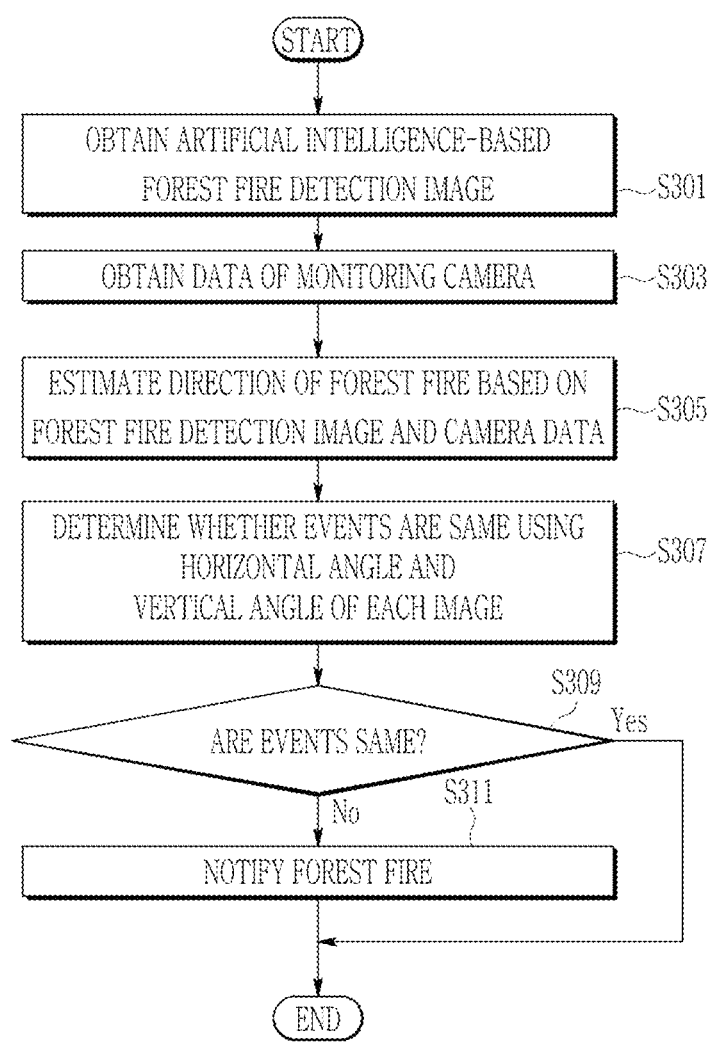
FIG. 3 is a flowchart illustrating a forest fire detection method according to an embodiment.

FIG. 3 is a flowchart illustrating a forest fire detection method according to an embodiment.

Referring to FIG. 3, the forest fire detection method according to an embodiment may obtain forest fire detection images based on artificial intelligence in step S301, and obtain monitoring camera data in step S303. In addition, the method may estimate a direction of a forest fire based on the forest fire detection images and the camera data in step S305, and determine whether events are the same, using a horizontal angle and a vertical angle of each of the forest fire detection images in step S307.

As a result of determination, when it is determined that the events represented by the respective forest fire detection images are not the same (S309, N), a forest fire notification may be provided to a user in step S311, and when it is determined that the events represented by the respective forest fire detection images are the same (S309, Y), the forest fire notification to the user may be omitted.

Figure 4:
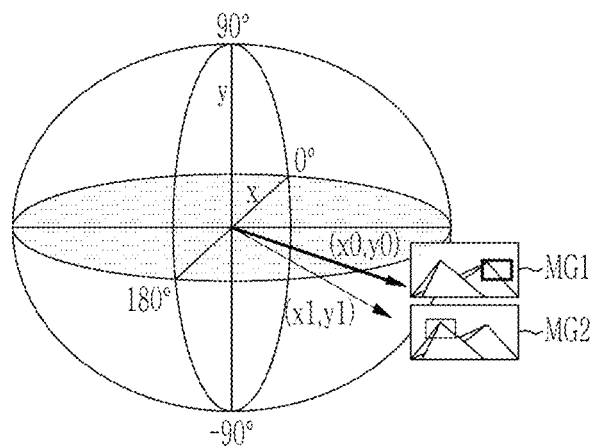
FIG. 4 is a diagram illustrating an operation of a forest fire detection system according to an embodiment.

FIG. 4 is a diagram illustrating an operation of a forest fire detection system according to an embodiment.

Referring to FIG. 4, in the forest fire detection system according to an embodiment, the same event determination module 32 may use a spherical coordinate system to compare the horizontal angle HA and the vertical angle VA of each of the plurality of forest fire detection images IMG1 and IMG2. Specifically, when the horizontal angle HA and the vertical angle VA are expressed as x and y, respectively, the horizontal angle HA and the vertical angle VA of the forest fire detection image IMG1 may be x0 and y0, respectively, and the horizontal angle HA and the vertical angle VA of the forest fire detection image IMG2 may be x1 and y1, respectively. At this time, a horizontal angle difference Δx of the forest fire detection images IMG1 and IMG2 may be |x1−x0|, and a vertical angle difference Δy may be |y1−y0|.

Figure 5:
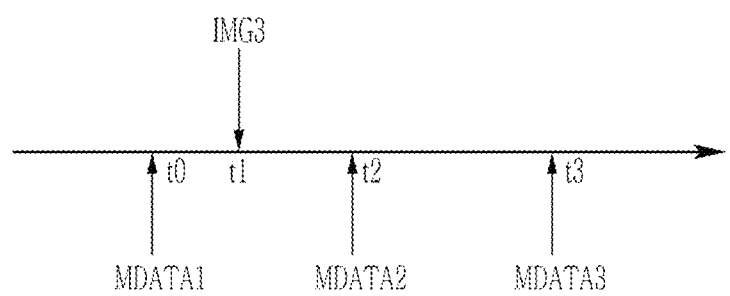
FIG. 5 is a diagram illustrating an operation of a forest fire detection system according to an embodiment.

The same event determination module 32 may determine whether images detected from the forest fire detection images IMG1 and IMG2 are the same according to whether values of the horizontal angle difference Δx and the vertical angle difference Δy are within a predetermined range or are 0. FIG. 5 is a diagram illustrating an operation of a forest fire detection system according to an embodiment.

Referring to FIG. 5, when data MDATA1 and MDATA2 of the monitoring camera are provided at a first time t0 and a second time t2, respectively, and a forest fire detection image IMG3 is provided at a third time t1 between the first time t0 and the second time t2, the direction estimation module 30 may estimate a direction of a forest fire on a map with respect to data at the first time t0 when the data at the first time t0 is the same as data at the second time t2. Unlike this, when the data at the first time t0 is different from the data at the second time t2, and when values of a pan and a FoV at the second time t2 are included in values of a pan and a FoV at the first time t0, the direction estimation module 30 may determine this as a zoom-in situation, and estimate the direction of the forest fire on the map with respect to the data at the first time t0.

Here, the third time t1 may be obtained through a generation time of the forest fire detection image IMG3 included in EXchangable Image File format (Exif) information of the forest fire detection image IMG3, and the first time t0, the second time t2, and a fourth time t3 may be update times of the camera data MDATA1, MDATA2, and MDATA3.

An update period of the camera data MDATA1, MDATA2, and MDATA3 may be different from an update period of the forest fire detection image IMG3. For example, the update period of the camera data MDATA1, MDATA2, and MDATA3 may be 9 to 16 seconds, and the update period of the forest fire detection image IMG3 may be 10 seconds. Due to this, a direction estimation error may occur. According to the present embodiment, it is possible to prevent occurrence of such an error.

That is, when the camera data MDATA1 at the first time t0 is the same as the camera data MDATA2 at the second time t2, the direction estimation module 30 may estimate the direction with respect to the values of the pan, zoom, and FoV at the first time t0.

When the camera data MDATA1 at the first time t0 is different from the camera data MDATA2 at the second time t2, if the values of the pan and the FoV at the second time t2 are included in the values of the pan and FoV at the first time t0, the direction estimation module 30 may determine this as the zoom-in situation, and estimate the direction with respect to the camera data MDATA1 at the first time t0.

When the camera data MDATA1 at the first time t0 is different from the camera data MDATA2 at the second time t2 but if the values of the pan and the FoV at the second time t2 are not included in the values of the pan and FoV at the first time t0, the direction estimation module 30 may recursively perform the method on the camera data MDATA2 at the second time t2 and the camera data MDATA3 at the fourth time t3. That is, when the camera data MDATA2 at the second time t2 is the same as the camera data MDATA3 at the fourth time t3, the direction estimation module 30 may estimate the direction with respect to the values of the pan, zoom, and FoV at the second time t2, when the camera data MDATA1 at the second time t2 is different from the camera data MDATA2 at the fourth time t3, if values of the pan and the FoV at the fourth time t3 are included in the values of the pan and FoV at the second time t2, the direction estimation module 30 may determine this as the zoom-in situation, and estimate the direction with respect to the camera data MDATA2 at the second time t2.

According to the present embodiment, even when the update period of the camera data MDATA1, MDATA2, and MDATA3 is different from the update period of the forest fire detection image IMG3, it is possible to prevent the occurrence of a direction tracking error.

Figure 6:
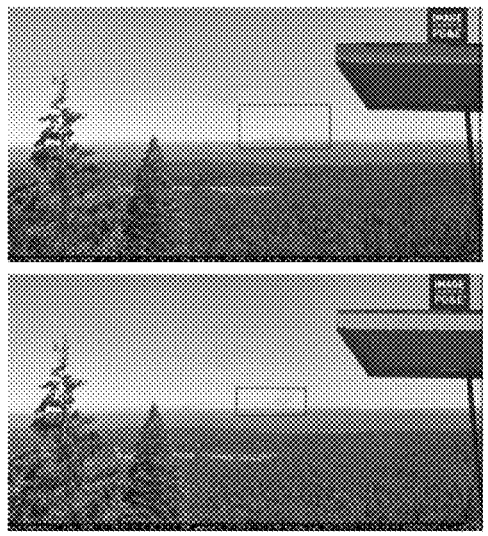
FIG. 6 is a diagram illustrating forest fire detection images corresponding to a case where it is determined that events are the same according to an embodiment.

FIG. 6 is a diagram illustrating forest fire detection images corresponding to a case where it is determined that events are the same according to an embodiment. That is, in the diagram of FIG. 6, values of the horizontal angle difference Δx and the vertical angle difference Δy may be within a predetermined range or correspond to zero. In this case, redundant forest fire notifications to a user may be omitted.

Figure 7:
FIG. 7 is a diagram illustrating forest fire detection images corresponding to a case where it is determined that events are different according to an embodiment.

FIG. 7 is a diagram illustrating forest fire detection images corresponding to a case where it is determined that events are different according to an embodiment. That is, in the diagram of FIG. 7, values of the horizontal angle difference Δx and the vertical angle difference Δy may be equal to or greater than a predetermined range. In this case, a forest fire notification may be provided to a user.

Figure 8:
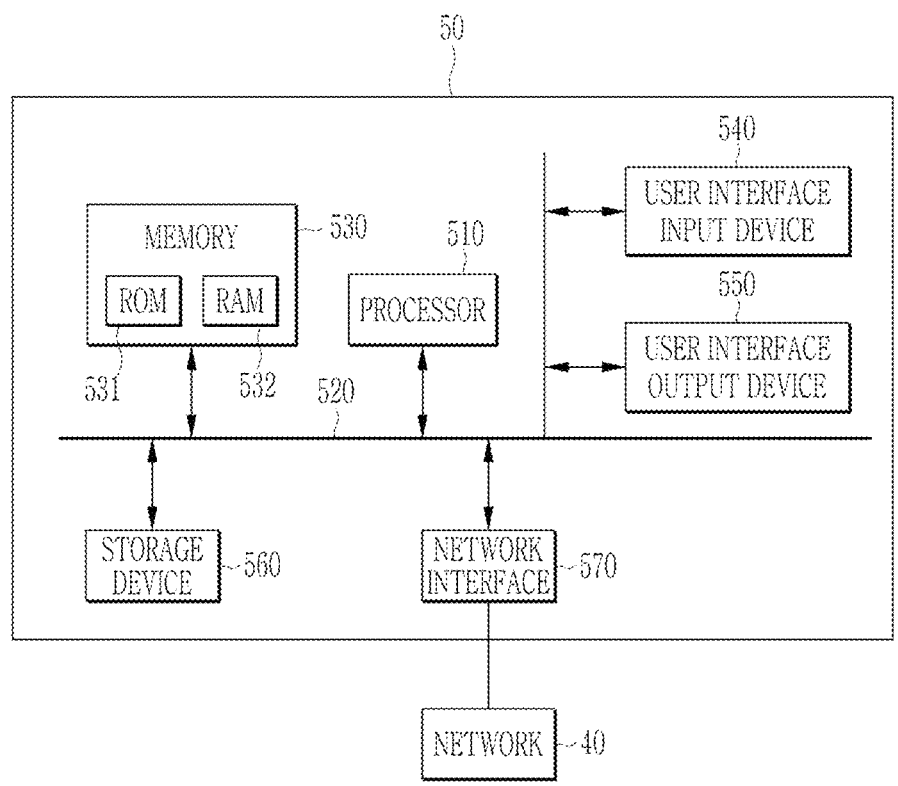
FIG. 8 is a block diagram illustrating a computing device for implementing a forest fire detection system and method according to embodiments.

FIG. 8 is a block diagram illustrating a computing device for implementing a forest fire detection system and method according to embodiments.

Referring to FIG. 8, the forest fire detection system and method according to embodiments may be implemented using a computing device 50.

The computing device 50 may include at least one of a processor 510, a memory 530, a user interface input device 540, a user interface output device 550, and a storage device 560 which perform communication via a bus 520. The computing device 50 may also include a network interface 570 electrically connected to a network 40, for example, a wireless network. The network interface 570 may transmit or receive signals with other entities over the network 40.

The processor 510 may be implemented in various types such as an application processor (AP), a central processing unit (CPU), a graphics processing unit (GPU), etc., and may be any semiconductor device that executes a command stored in the memory 530 or the storage device 560. The processor 510 may be configured to implement the functions and methods described with respect to FIGS. 1 to 7.

The memory 530 and the storage device 560 may include various types of volatile or non-volatile storage media. For example, the memory 530 may include a read-only memory (ROM) 531 and a random access memory (RAM) 532. The memory 530 may be located inside or outside the processor 510, and the memory 530 may be connected to the processor 510 through various already known means.

In addition, at least part of the forest fire detection system and method according to the embodiments may be implemented as a program or software executed in the computing device 50, and the program or software may be stored in a computer-readable medium.

In addition, at least part of the forest fire detection system and method according to the embodiments may be implemented as hardware capable of being electrically connected to the computing device 50.

According to the embodiments of the present disclosure described above, unnecessary redundant notifications may be reduced and the accuracy of forest fire notification may be increased, by determining whether events represented by a plurality of forest fire detection images are the same.

Although the embodiment of the present disclosure has been described in detail above, the scope of the present disclosure is not limited thereto, and various modifications and improvement forms of those skilled in the art using the basic concept of the present disclosure as defined in the following claims are also within the scope of the present disclosure.

What is claimed is:

1. A forest fire detection system comprising:
an artificial intelligence-based forest fire detection module that detects a forest fire from a captured image using an artificial intelligence model;
a monitoring camera configured to monitor a predetermined area;
a direction estimation module configured to estimate a direction of the forest fire on a map, using a plurality of forest fire detection images provided from the artificial intelligence-based forest fire detection module and data of the monitoring camera; and
a same event determination module configured to determine whether events represented by the plurality of forest fire detection images are the same, based on the estimated direction of the forest fire.

2. The forest fire detection system of claim 1, wherein:
the direction estimation module is configured to output the direction of the forest fire on the map using a horizontal angle and a vertical angle.

3. The forest fire detection system of claim 2, wherein:
the same event determination module is configured to compare the horizontal angle and the vertical angle with respect to the plurality of forest fire detection images and determine whether the events represented by the plurality of forest fire detection images are the same.

4. The forest fire detection system of claim 1, further comprising:
a forest fire notification module configured to omit a forest fire notification to a user when it is determined that the events represented by the plurality of forest fire detection images are the same.

5. The forest fire detection system of claim 1, wherein:
the plurality of forest fire detection images include an image generation time, an image resolution value, and pixel information where the forest fire is located.

6. The forest fire detection system of claim 5, wherein:
the data of the monitoring camera includes information about a camera field of view (FoV), a camera position including a latitude and a longitude, and a camera pan-tilt-zoom (PTZ).

7. The forest fire detection system of claim 6, wherein:
the direction estimation module is configured to estimate the direction of the forest fire on the map based on the pixel information and the information about the camera FoV and the camera PTZ.

8. The forest fire detection system of claim 1, wherein:
when the data of the monitoring camera is provided at a first time and a second time, and the forest fire detection images are provided between the first time and the second time,
the direction estimation module is configured to
estimate the direction of the forest fire on the map based on the data at the first time if the data at the first time is the same as the data at the second time, and,
estimate the direction of the forest fire on the map based on the data at the first time if the data of the first time is different from the data of the second time, and if values of a pan and a FoV of the second time are included in values of a pan and a FoV of the first time.

9. A forest fire detection method comprising:
detecting a forest fire from a captured image using an artificial intelligence model;
monitoring a predetermined area, using a monitoring camera;
estimating a direction of the forest fire on a map, using a plurality of detected forest fire detection images and data of the monitoring camera; and
determining whether events represented by the plurality of forest fire detection images are the same, based on the estimated direction of the forest fire.

10. The forest fire detection method of claim 9, wherein:
the estimating of the direction of the forest fire on the map includes outputting the direction of the forest fire on the map using a horizontal angle and a vertical angle.

11. The forest fire detection method of claim 10, wherein:
the determining of whether events represented by the plurality of forest fire detection images are the same includes comparing the horizontal angle and the vertical angle with respect to the plurality of forest fire detection images and determining whether the events represented by the plurality of forest fire detection images are the same.

12. The forest fire detection method of claim 9, further comprising:
omitting a forest fire notification to a user when it is determined that the events represented by the plurality of forest fire detection images are the same.

13. The forest fire detection method of claim 9, wherein:
the plurality of forest fire detection images include an image generation time, an image resolution value, and pixel information where the forest fire is located.

14. The forest fire detection method of claim 13, wherein:
the data of the monitoring camera includes information about a camera field of view (FoV), a camera position including a latitude and a longitude, and a camera pan-tilt-zoom (PTZ).

15. The forest fire detection method of claim 14, wherein:
the estimating of the direction of the forest fire on the map includes estimating the direction of the forest fire on the map based on the pixel information and the information about the camera FoV and the camera PTZ.

16. The forest fire detection method of claim 9, wherein:
when the data of the monitoring camera is provided at a first time and a second time, and the forest fire detection images are provided between the first time and the second time,
the estimating of the direction of the forest fire on the map includes
estimating the direction of the forest fire on the map based on the data at the first time if the data at the first time is the same as the data at the second time, and
estimating the direction of the forest fire on the map based on the data at the first time if the data of the first time is different from the data of the second time, and if values of a pan and a FoV of the second time are included in values of a pan and a FoV of the first time.

* * * * *